Patented Mar. 2, 1943

2,312,708

UNITED STATES PATENT OFFICE 2,312,708

DRESSED AND SOFTENED REGENERATED CELLULOSE PRODUCTS

Walter Gellendien, Berlin-Charlottenburg, and Johann Eggert, Berlin, Germany, assignors, by mesne assignments, to "Patchem" A.-G. Zur Beteiligung an Patenten und Sonstigen Erfindungsrechten auf Chemische Verfahren, Zurich, Switzerland, a corporation of Switzerland No Drawing. Application March 7, 1939, Serial No. 260,430. In Germany January 31, 1934

5 Claims. (Cl. 117—144)

The subject matter of the present application is in part disclosed in application Serial No. 1,327, filed January 31, 1935, now Patent No. 2,273,636.

This invention relates to regenerated cellulose and softening agents therefor. Regenerated cellulose products and particularly those obtained from aqueous cellulose solutions are commonly treated with glycerol to impregnate the same for the purposes of preventing shrinkage or for the purpose of softening the material. When impregnating the regenerated cellulose in order to prevent drying out and shrinking, concentrated glycerol solutions are generally employed whereas for merely softening the same dilute solutions are preferable.

However glycerol is very hygroscopic and for this reason has several disadvantages. When used as a softening agent the glycerol renders the cellulose products extremely sensitive to moisture so that even a slight increase in the humidity of the air is sufficient to cause a too great and disadvantageous softening of the materials and even to cause them to swell, so that cellulose foils lose their shape and their clearness and transparency is materially decreased. Since the cellulose products treated with glycerol often contain 9 to 12% of glycerol, they are inclined to putrefaction and decomposition. For example, in an atmosphere of high humidity such as found in the tropics the glycerol impregnated cellulose will absorb so much moisture that the materials will readily spoil. The impregnated cellulose products also adhere to each other to an extent to cause considerable loss. Glycerol is effective as an impregnation agent to prevent shrinkage of the cellulose products but it has serious limitations because of the disadvantages above discussed.

It has been discovered in accordance with the present invention that the above noted difficulties can be very much reduced or entirely eliminated by the use of compounds of glycerol in which a sufficient proportion of the hydroxyl groups of the glycerol are eliminated to reduce the hygroscopicity. Furthermore, similar compounds of other similar polyhydric alcohols are also effective as substitutes for glycerol.

The hydroxyl groups can satisfactorily be eliminated by reacting the glycerol with aliphatic acids and alcohols for form esters or ethers hereof.

The reduction of the hygroscopicity is in general greater as the proportion of the hydroxyl groups is reduced. It is also greater as the molecular weight of the compounds formed is greater, that is to say when the acids and alcohols substituted for the hydroxyl groups are of higher molecular weight. This replacement of hydroxyl groups can be carried to the extent of producing complete insolubility in water.

It has also been discovered that the glycerol ethers and esters which have a certain water solubility or which can be rendered water soluble by the addition of low molecular alcohol such as methyl, ethyl or propyl alcohol have a particularly desirable dressing and softening effect.

It is one of the advantages of the invention that the hygroscopicity can be reduced to such extent as is considered most desirable for an impregnating or softening agent that is to be used under any given conditions. By a suitable combination or mixture of the impregnating materials mentioned in an aqueous, alcoholic or alcoholic aqueous solution it is possible to obtain dressing or impregnating agents for treating regenerated cellulose products which will give desired properties thereto. By treatment with such suitably selected mixtures the disadvantages heretofore existing in regenerated cellulose products dressed with glycerol are substantially or entirely eliminated.

It is contemplated that not only glycerol but other polyhydric alcohols of the same type having about 3 to 5 carbon atoms in the molecule and polyglycerols and also alkylene glycols and the like may be used to form the compounds in accordance with the invention for the uses indicated although the glycerol is preferred as the base material.

The alcohols which are to be reacted with the glycerol or its equivalent are the normal primary aliphatic alcohols having from 1 to 18 carbon atoms in the molecule. The mono-hydric alcohols are preferred. Those having from 1 to 8 carbon atoms are generally preferred. Those having 12 to 18 carbon atoms are preferable when low solubility is desired.

Acids suitable for use for esterification are the normal primary monocarboxylic aliphatic acids having 1 to 18 carbon atoms and preferably those having from 1 to 8 carbon atoms in the molecule. The number of hydroxyl groups of the glycerol or its equivalent which are substituted by reaction with the acid or alcohol will depend upon the results desired as above indicated.

The dicarboxylic acids having 1 to 18 carbon atoms in the molecule e. g. oxalic acid, succinic acid, sebasic acid, cyclohexane diacetic acid, phthalic acids and the like are also suitable for use in forming esters whereby the hydroxyl group is substituted.

Aromatic or cyclo aliphatic compounds of alcoholic character may also be used in the formation of suitable ethers, such for example as glycerol mono- or diphenyl ether and glycerol mono- or di-cyclo hexyl ether.

Among the numerous suitable compounds prepared from glycerol or its equivalents may be cited—

Ethyleneglycol-monomethylether
Ethyleneglycol-monobutylether
Ethyleneglycol-monododecylether
Ethyleneglycol-dimethylether Glycerol-monomethylether
Glycerol-monoethylether
Glycerol-monobutylether
Glycerol-monooctylether
Glycerol-monocetylether Glycerol-dimethylether
Glycerol-dipropylether
Glycerol-dioctylether
Glycerol-didodecylether
Glycerol-diphenylether
Glycerol-dicyclohexylether
Glycerol-trinaphtenylether Polyglycerol-monododecylether
Polyglycerol-monooctadecenylether Penta erythrite-monooctylether
Penta erythrite-dibutylether Ethylene glycol-monoacetate
Ethylene glycol-monocaprylate Glycerol-monopropionate
Glycerol-monolaurate
Glycerol-dibutyrate
Glycerol-oxalate
Glycerol-adipinate
Glycerol-phthalate The compounds herein discussed may be described for convenience as compounds of the general formula X—Y—R, wherein X represents a radical derived from a polyhydric aliphatic alcohol having 2 to 6 carbon atoms in the molecule, Y represents O or OCO and R represents an alkyl or alkylene radical containing 1 to 18 carbon atoms or a radical derived from an aromatic or cyclo aliphatic compound of alcoholic character.

Examples of the uses of various products in accordance with the present invention may be described as follows:

*Example 1*

To make soft and elastic cellulose-foils out of cellulose-xanthogenate one passes the ready formed film in a humid of half-dried state through a warm watery impregnation-bath of about 35° and containing 1.5% of triacetine besides 1.5% of glycerol-monomethylether. The film is then dried in the usual way and cut to the desired size. The thus obtained foils show an excellent flexibility and also during a long storage they remain smooth, clear and transparent. Those foils are able to offer certain resistance to the reaction of aqueous vapour. Instead of the said impregnation-agent it is also allowed to employ merely a 3% solution of glycerol-monomethylether or glycerol-monoethylether or a mixture of 2% glycerol-monomethylether and 1% glycerol-monooctylether.

*Example 2*

Humid or half-dried cellulose-products obtained according to the cupric oxide-ammonia-cellulose-procedure are treated, e. g. in the form of ribbons, with an alcoholic-watery solution (about 20 to 25% of ethylalcohol) containing 4% of glycerol-dimethylether and 2% of glycerol-monomethylether. The cellulose products are then subject to the further treatment and after the drying they are of an excellent elasticity and softness. Instead of the above impregnation-bath one may employ with a similar good success an alcoholic-watery solution of 3% of glycerol-monoethylether and 2% of polyglycerol-dodecylether.

*Example 3*

Artificial guts or tubes, made of cellulose according to the wellknown method, are impregnated in an aqueous bath containing 1.5% of glycerol-mononaphthenylether, 2% of glycol-monomethylether and 0.8% of triacetine. The products impregnated with this liquid are of a good elasticity and also during a long storage they do not incline neither to shrinkage nor to sticking together. Instead of the above indicated impregnation-bath-admixture one may likewise use a mixture of 4 parts of glycerol-monomethylether and 1 part of isopropylalcohol or a mixture of 3 parts of polyglyceroldodecylether, 2 parts of glycerol-monoethylether and 1 part of isopropylalcohol.

The various products may be produced in accordance with known methods of the formation of ethers and esters. For example, by allowing to react the glycerol or the other polyvalent alcohols in the form of their mineral acid mono- or polyesters with alkalimetal compounds of the aliphatic or cycloaliphatic alcohol series or by esterification of the glycerol or of the other polyvalent alcohols with mono- or dibasic carboxylic acids or their functional derivatives.

The foregoing particular description is illustrative merely and is not intended as defining the limits of the invention. It will be understood that equivalent treating agents can be formed by using different starting materials than those specifically mentioned.

We claim:

1. A dressing and softening agent for regenerated cellulose products consisting of an aqueous impregnation liquid containing 1.5% of glycerol-monoethylether and 1.5% of triacetin.

2. A dressing and softening agent for regenerated cellulose products consisting of an aqueous impregnation liquid containing a water soluble ether of glycerol with an aliphatic alcohol having 1 to 8 carbon atoms in the molecule and triacetine.

3. A regenerated cellulose composition containing as a dressing and softening agent an aqueous impregnation liquid containing 2% of glycerol monomethyl ether and 1% of glycerol monooctyl ether.

4. A regenerated cellulose composition containing as a dressing and softening agent an aqueous impregnation liquid containing a water-soluble ether of glycerol with an aliphatic alcohol having one to eight carbon atoms in the molecule.

5. A regenerated cellulose composition containing as a dressing and softening agent an aqueous impregnation liquid containing a water-soluble ether of glycerol with an aliphatic alcohol having one to eighteen carbon atoms in the molecule.

WALTER GELLENDIEN.
JOHANN EGGERT.